Dec. 28, 1965   O. E. ALBERTSON   3,226,317
ANAEROBIC DIGESTION OF WASTE SLUDGES
Filed Aug. 15, 1962   6 Sheets-Sheet 2

INVENTOR.
ORRIS E. ALBERTSON
BY Theodore M. Jablon
ATTORNEY.

Dec. 28, 1965     O. E. ALBERTSON     3,226,317
ANAEROBIC DIGESTION OF WASTE SLUDGES
Filed Aug. 15, 1962                                     6 Sheets-Sheet 3

FIG. 4

EXAMPLE I (A)
Raw Sludge
4% Total Solids Suspended
6250 lbs Total Solids/day
80% Volatile Solids/day
5000 lbs Volatile Solids/day
2500 cu ft of sludge/day
18750 gals/day (B)
4.3% Total Solids Suspended
7240 lbs Total Solids/day
79.5% Volatile Solids/day
5765 lbs Volatile Solids/day
2690 cu ft/day
20.170 gals/day (C)
2.15% Total Solids Suspended
3600 lbs Total Solids/day
60% Volatile Solids/day
2100 lbs Volatile Solids/day
2690 cu ft/day
20.170 gals/day (D)
40% Total Solids Suspended
2500 lbs Total Solids/day
50% Volatile Solids/day
1250 lbs Volatile Solids/day
—
—

(E)
0.68% Total Solids Suspended
1100 lbs Total Solids/day
77% Volatile Solids/day
850 lbs Volatile Solids/day
2590 cu ft/day
19,420 gals/day (F)
0.07% Total Solids Suspended
110 lbs Total Solids/day
77% Volatile Solids/day
85 lbs Volatile Solids/day
2400 cu ft/day
18,000 gals/day (G)
8% Total Solids Suspended
990 lbs Total Solids/day
77.2% Volatile Solids/day
765 lbs Volatile Solids/day
190 cu ft/day
1420 gals/day INVENTOR.
ORRIS E. ALBERTSON
BY *Theodore M. Jablon*
ATTORNEY.

Dec. 28, 1965

O. E. ALBERTSON

3,226,317

ANAEROBIC DIGESTION OF WASTE SLUDGES

Filed Aug. 15, 1962

EXAMPLE II (A)
10% Total Solids Suspended
6250 lbs Total Solids/day
80% Volatile Solids/day
5000 lbs Volatile Solids/day
1000 cu ft/day
7500 gals/day (B)
9.65% Total Solids Suspended
7240 lbs Total Solids/day
79% Volatile Solids/day
5765 lbs Volatile Solids/day
1190 cu ft/day
8920 gals/day (C)
4.76% Total Solids Suspended
3600 lbs Total Solids/day
60% Volatile Solids/day
2100 lbs Volatile Solids/day
1190 cu ft/day
8920 gals/day (D)
40% Total Solids Suspended
2500 lbs Total Solids/day
50% Volatile Solids/day
1250 lbs Volatile Solids/day
—
—

(E)
1.62% Total Solids Suspended
1100 lbs Total Solids/day
77.2% Volatile Solids/day
850 lbs Volatile Solids/day
1090 cu ft/day
8170 gals/day (F)
0.19% Total Solids Suspended
110 lbs Total Solids/day
77% Volatile Solids/day
85 lbs Volatile Solids/day
900 cu ft/day
6750 gals/day (G)
8% Total Solids Suspended
990 lbs Total Solids/day
77.2% Volatile Solids/day
765 lbs Volatile Solids/day
190 cu ft/day
1420 gals/day INVENTOR.
ORRIS E. ALBERTSON
BY *Theodore M. Jablon*

ATTORNEY.

Dec. 28, 1965          O. E. ALBERTSON          3,226,317
ANAEROBIC DIGESTION OF WASTE SLUDGES
Filed Aug. 15, 1962                  6 Sheets-Sheet 5

INVENTOR.
ORRIS E. ALBERTSON
BY Theodore M. Jablon
ATTORNEY.

United States Patent Office 3,226,317
Patented Dec. 28, 1965

3,226,317
ANAEROBIC DIGESTION OF WASTE SLUDGES
Orris E. Albertson, Norwalk, Conn., assignor to Dorr-Oliver Incorporated, Stamford, Conn., a corporation of Delaware
Filed Aug. 15, 1962, Ser. No. 217,041
23 Claims. (Cl. 210—6)

This invention relates to the disposal treatment of putrescible waste sludges, for example, sewage sludge, through anaerobic digestion effecting the destruction of the putrescible organic matter in the sludge by way of bacterial conversion into gas.

It is among the objects of this invention to provide a simple low cost highly compact anaerobic sewage sludge digestion system of high digestion efficiency and improved digester tank utilization, so that with a minimum of tank volume the system is operable at high volatile solids loading rates and maximum gas recovery, and at a minimum expenditure for maintenance.

More particularly, this invention aims to provide a digestion system operable at volatile solids or organics loading rates significantly higher than those that are now applicable to, or can be handled safely by conventional digestion systems, yet capable of delivering a well digested inoffensive sludge comparable for instance to digested sludge derived from a properly operated conventional two-stage digestion system.

Another aim of the invention is to provide for the discharge of a highly concentrated easily disposable digested sludge from the system, even while operating the digester at economically high organics loading rates.

A concurrent aim is to deliver a digester liquor of a quality suited for maintaining a high level of efficiency of the sewage treatment plant as a whole, in view of the fact that such liquor must be retreated by recirculation to the initial treatment section of the plant.

Another object is to provide a digestion system that is readily controllable as to quality of the products of digestion.

Physically, raw sewage sludge presents the appearance of a lumpy, slimy, viscous and malodorous mass wherein the undigestible matter including the inorganics such as ash and sand appear entrapped in, and coated by the digestible organic matter whereas the digested sludge contains the undigestible matter, so to speak, as a skeleton from which the organic burden or flesh has been removed by the bacterial conversion thereof into gas. The digestible or gasifiable solids are represented mainly by the basic components proteins, carbonaceous matter, carbohydrates, grease and fats, whereas the undigestible solids comprise largely cellulosic matter, sand and the like.

A generally acceptable inoffensive digested sludge, however, should be digested sufficiently to be non-odorous, a requirement usually met by a sludge wherein about 90% to 95% of the gasifiable volatile matter has been digested by conversion to gas, with the remaining ungasifiable and inoffensive sludge solids usually representing about 50% of the total solids present in the raw undigested sludge.

Raw sludge is usually pumped from the bottom of the liquid body in the clarifiers where it is outwardly inoffensive, into the digestion system from which in turn it is delivered and exposed to the outer environment only after having lost its offensiveness, in the form of digested sludge. Thereafter, the digested sludge usually at a solids concentration in the order of 5%, is frequently subjected to filtration on a continuous drum filter requiring considerable maintenance as well as substantial quantities of coagulating filter aid material in order that a filter cake of a usual solids concentration in the order of 25% to 30% may be obtained for further disposal as land-fill or the like, while relatively clear filtrate liquor is recirculated to the clarifiers for retreatment usually along with the supernatant liquor derived from the secondary tank or stage of conventional digestion systems. Sand drainage beds receiving normally digested sludge which has a solids concentration of about 5%, and straight haulage are alternative cumbersome means for disposing of digested sludge, which this invention aims to eliminate. The elimination of the drainage beds in particular provides extra plant space while doing away with periodical bed cleaning operations and the removal of the dried sludge therefrom.

In the conventional two-stage digestion system the primary digestion stage or tank normally carries nearly the entire burden of digestion whereby the offensive organic solids are converted into gas while in a stage of agitation. The secondary stage or tank receiving transfer sludge from the primary tank performs its major function of separating supernatant liquor, so-called digester supernatant, under conditions of quiesence.

But various conditions and limitations must be observed in the conventional digestion operation in order to sustain adequate or optimum performance, all directed towards producing a fully digested sludge as well as a supernatant liquor of a quality best suited for retreatment by recirculation, such as to minimize the total burden on the treatment facilities and to provide optimum overall efficiency of the treatment plant as a whole. Accordingly, certain requirements as to adequately large tank volume in the digestion system have had to be met to insure its proper operation.

Accordingly, the dimensioning of the primary digestion tank is governed by the requirement that the resulting sludge be sufficiently digested for releasing supernatant liquor in the secondary stage, and to be inoffensive in the process of further disposal. The secondary digestion stage or tank in turn must be large enough so as to be capable of receiving the transfer sludge from the primary tank and holding it in a quiescent stage long enough to separate the supernatant liquor in spite of any disturbing effects arising due to conversion of remaining organic matter into gas.

Moreover, in the operation of the conventional digestion system, the raw sludge feed should not be too dilute for the reason that the alkalinity concentration normally present as a product of digestion is then lowered below the level required to sustain digestion, so that the favorable bacterial environment is then lost. Also, batch-wise feeding of raw sludge at relatively large intervals is usually necessary in order to encourage the formation of supernatant liquor during the intervening periods of quiescence.

Consequently, in the conventional digestion system, the required tank volume is very large, that is large enough not only to absorb fluctuations in the rate of feed and concentration of the raw sludge, but also large enough to be capable of withstanding the long interruptions in feed supply due to batch feeding operation. Also, the tank volume has had to be adequate to provide prolonged detention of the large quantity of water contained in the dilute raw sludge entering the tank to allow for adequate digestion. At any rate, the dimensioning and the operation of the digestion system were governed by the problem of satisfactory supernatant separation, as well as by the rate at which volatile organic matter could be converted into gas under the conditions prevailing in the digesting mass.

In view of the foregoing conditions and limitations pertaining to the operation of the conventional digestion systems, one obstacle to increasing the volatile solids loading rate by increasing the feed rate of the raw sludge is due to the fact that the transfer sludge displaced by the feed from the first stage of the system will carry increasing amounts of undigested solids into the secondary stage, whereby the quiescence necessary for the separation of the supernatant liquor is made impossible. This in turn would make it necessary to allow for even larger periods of feed interruption.

Another hindrance to increasing the digester loading rate is the displacement of and loss from the digester of increasing amounts of alkalinity in the liquor, which alkalinity is necessary for maintaining a favorable environment for sustaining the biological life responsible for the destruction of the organic matter by conversion into gas. This alkalinity formed in the digestion process derives mainly from the biochemical decomposition of protein substances, resulting in the formation of ammonium bicarbonate. If this alkalinity is displaced in the digested sludge by the incoming raw feed sludge faster than the alkalinity can be formed, then the concentration of alkalinity will decrease and may reach a critically low level where the bacterial organisms responsible for digestion will no longer survive and the digestion process will fail.

Another obstacle to increasing the digester loading rate lies in the character of the composition of the raw sludge, in that some of the components, especially the aforementioned greases and fats, require a great deal longer to digest than others such as the proteins. The composition of the organic matter in raw primary clarifier sludge is generally about 16% to 20% protein, 18% to 25% grease and 50% to 60% carbohydrates. The carbohydrates include both simple and complex compounds such as cellulose which is very difficult to break down under anaerobic conditions, whereas the simpler compounds such as sugars are rapidly reduced. About 50% to 60% of the organic nitrogen (assumed to be protein) is very rapidly hydrolyzed to organic acids and ammonia nitrogen. The organic acids are then converted to $CO_2$ and $CH_4$. The remainder of the organic nitrogen is relatively stable and likely represents anaerobic cell tissue. But there is evidence that among the sludge components grease requires the longest detention time for effecting its decomposition into $CO_2$ and $CH_4$ in conventional digesters. Also, grease and fats while capable of producing a large proportion of the gas and one that is of high quality, are also the most undesirable to handle and the most putrescible. Therefore, it is most desirable to have the grease completely hydrolyzed in the anaerobic digestion process, and a correspondingly long detention time in terms of tank volume is therefore normally provided in adequately dimensioned conventional digestion systems.

However, when properly operated in the light of the foregoing limitations and conditions, the conventional digestion system has fulfilled the objective of producing a well digested sludge reduced in volume by the separation of an acceptable quality of supernatant liquor subject to its retreatment by recirculation. Hence, sanitary engineering practice has accepted the above outlined two-stage digestion system over the last two or three decades.

Yet, the invention provides an improved digestion system which eliminates substantially all of the foregoing limitations and obstacles that lie in the path to significantly increasing the digester loading rate and minimizing the tank volume requirements far below that of conventional digestion systems, even though producing a comparably well digested sludge as well as a liquor of comparable quality.

Furthermore, while doing away with haulage of dilute sludge, and with the operation of sand-filter beds, the invention also obviates the need for the rotary drum filter with its maintenance and filter aid requirements in the disposal of the digested sludge, even though producing the sludge economically concentrated to a moisture content comparing favorably with that attainable in filter cake, namely 40%–45% solids concentration attainable in the practice of this invention, as compared with 26–30% total solids filter cake concentration, thus facilitating the sludge disposal problem be it by hulage or combustion.

The foregoing objectives of the invention are attainable in an improved digestion system the operation of which is so controlled that the effective detention time in the digester of the gasifiable organic substance is greatly increased relative to the detention of the liquor, that is, the solids detention time is rendered independent of the liquid detention time. More particularly, the slow digesting raw sludge components, such as the grease and fats, are thus selectively given a longer detention time needed for their eventual digestion and conversion into gas. The net result is that a significantly higher organics loading rate with greater bacterial feed concentration and greater bacterial density is maintainable in the digesting mass along with an adequate alkalinity concentration in the liquor necessary for digestion. At the same time there is a maximum recovery of gas in a minimum of digestion space.

In order to attain these objectives the invention proposes to withdraw partially digested sludge from the body of digesting sludge in the digester tank at a suitably controlled rate, and subjecting the withdrawn sludge to treatment effecting the separation thereof into a first concentrated fraction substantially containing non-digestible solids adapted for disposal, a second concentrated fraction substantially containing undigested gasifiable matter for return into the digester, and a liquor fraction which may be recirculated to the head of the plant for retreatment.

This is, according to the invention, the rate of raw sludge feed into a given digester tank may be increased so that increasing amounts of undigested organic matter including the grease and fats will appear in the sludge discharging from the digester tank, whereupon only the separated fraction of undigested matter in relatively concentrated form is returned into the digester for conversion into gas.

Thus, with the concentrated organics recirculated into the digester, the net digester loading rate may be increased until optimum balanced conditions are attained in the digester operating cycle of this invention, providing maximum economy in first cost and operation including minimum heat requirements for the digester, while delivering a fully digested sludge concentrated for disposal, as well as a liquor of suitable quality, yet with the requisite alkalinity concentration safely maintainable in the digesting mass.

In one embodiment, the classification separation of the partially digested sludge is effected in a solid bowl type centrifugal machine, so controlled that a digested sludge fraction substantially freed of gasifiable matter is transported as sediment to the narrow end of the bowl for discharge in the form of a readily disposable highly concentrated cake material, whereas a dilute overflow fraction containing the digestible organics or gasifiable matter including the fats discharges from the wide end of the bowl subsequently to be dewatered or concentrated before being returned into the digester tank for conversion into gas. The dewatering or concentrating treatment of the dilute overflow fraction is advantageously carried out in a nozzle type bowl centrifuge (as distinct from the preceding solid bowl machine), wherein the concentration of the gasifiable organic fraction delivered as underflow from the nozzles of the machine is readily controllable by so-called underflow recirculation, while liquor separated as overflow from the rotor bowl may be recycled for retreatment in the plant.

Other features provide for a variety of arrangements resulting from the conversion of two-stage digestion systems to embody the invention, whereby existing digester tankage of two-stage digestion systems is utilizable at greatly increased digester loading rates.

Another feature lies in an arrangement whereby the raw sludge is subjected to a concentrating or thickening operation providing a reservoir for the thus treated sludge, which reservoir may supply feed sludge to the digester at short intervals or substantially continuously, thus further increasing digester efficiency and tank utilization.

According to still another feature, when raw sludge is supplied to the treatment plant in excess of digester capacity, this raw sludge is concentrated preferably by solid bowl centrifuge, and in mixture with the concentrated fraction or cake from the classification operation subjected to combustion.

Other features and advantages will hereinafter appear.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
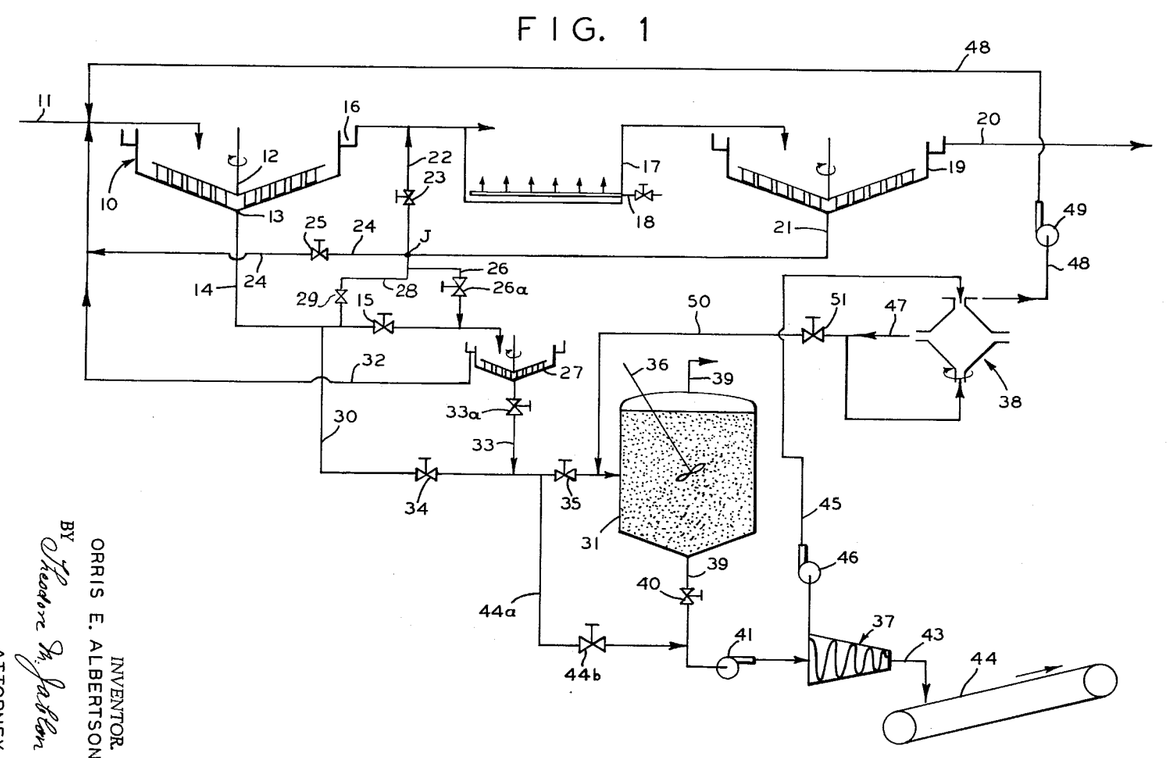
FIG. 1 illustrates one embodiment of the invention employing the solid bowl type and the nozzle type of centrifuge in series with each other, and in circuit with the highly loaded digester, the raw sludge for the digester being derived from primary and secondary clarifications.

As exemplified in FIG. 1 the invention may be embodied in a sewage treatment plant comprising a conventional clarification treatment system for producing raw sludge which may contain primary and secondary clarification sludge in mixture, adapted for treatment in an anaerobic digestion system.

Accordingly, the clarification treatment system in this example comprises a primary clarifier tank unit 10 supplied with raw sewage as indicated by a supply conduit 11, and equipped with the familiar rotary sediment raking structure 12 for conveying primary sludge or sediment to a bottom outlet 13 connected to a sludge discharge conduit 14 provided with control valve 15. The overflow launder 16 of this tank receives primary effluent containing suspended solids that will not settle in the primary tank, but may be subject to further clarification treatment. The primary effluent may be treated biologically, that is by aeration for example in an aeration tank 17 having a controlled air supply indicated at 18. The resulting so-called activated sludge containing the previously non-settleable solids converted into settleable biologic floc structures, is transferred from the aeration tank to a secondary clarifier tank 19 equipped substantially the same as the primary clarifier tank, and delivering secondary purified effluent 20 from the overflow, while secondary sludge is being withdrawn from the bottom zone as through a discharge conduit 21 leading to a juncture J.

From juncture J a branch conduit 22 provided with control valve 23 allows for recirculation of secondary sludge into the aeration tank at a controlled rate governed by the requirements of activated sludge tank operation. Another branch conduit 24 provided with control valve 25 leading from juncture J is operable to divert a portion of the secondary sludge back into the primary clarifier tank as by way of the raw sludge influent conduit 11. Another branch conduit 26 leading from juncture J provided with control valve 26a joins the primary sludge discharge conduit 14 downstream of the valve 15, whereby mixed primary and secondary sludge may be delivered into a tank 27 which may be in the nature of a thickening tank operated in accordance with Torpey Patent No. 2,850,449, and further to be described. The thickened sludge goes to a digestion system including a digester 31. Another branch conduit 28 from juncture J having control valve 29 may join the primary sludge discharge conduit 14 upstream of valve 15 whereby a portion of the mixture of primary and secondary sludge may by-pass the thickening tank 27 via conduit 30 for delivery to the digestion system or to the solid bowl machine. Effluent liquor from the thickening tank may be disposed of as by conduit 32 leading back into the primary clarifier tank.

A deep sludge bed of controlled depth maintained in the thickener tank 27 and controlled in accordance with the aforementioned Torpey patent may serve as a reservoir supplying the feed sludge for the digester 31 through underflow discharge connection 33 having control valve 33a. This underflow connection joins the aforementioned conduit 30 at a point between control valves 34 and 35.

The raw sludge fed to the digester 31 may be a mixture of primary and secondary sludge, which may have been subjected to a concentrating or thickening treatment such as above indicated in tank 27. The sludge is supplied preferably continuously or at short intervals to the digester 31 which in turn is operated in the special manner of this invention affording significantly increased volatile solids loading rates and greatly improved digester tank utilization as will be furthermore set forth. The body of digesting sludge in the digester is kept in a state of enforced agitation as indicated by the agitator 36.

Figure 2:
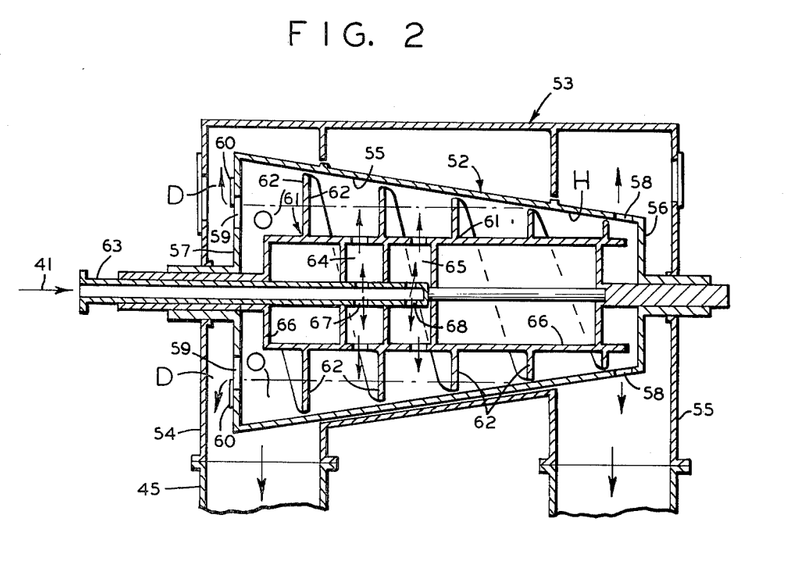
FIGS. 2 and 3 semi-diagrammatically illustrate the solid bowl type and the nozzle bowl type of centrifuge respectively, employed in the example of the treatment system of FIG. 1.
Figure 3:
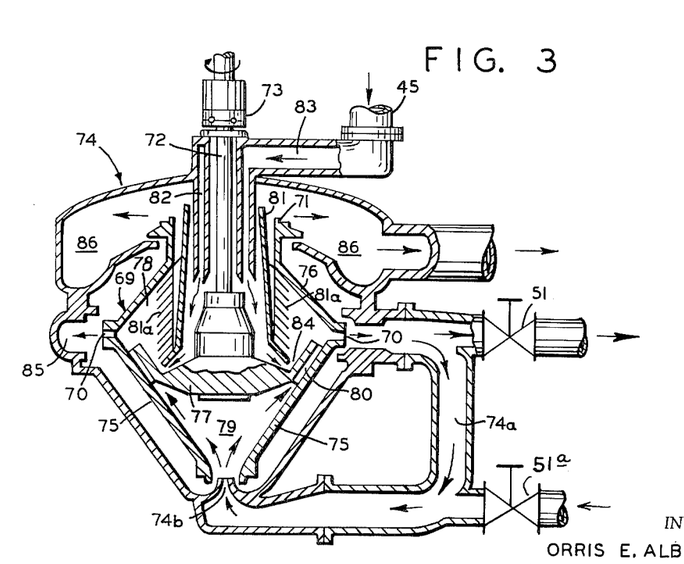

In this embodiment of the digestion system the digester 31 operates in circuit with a solid bowl type centrifugal machine 37 described below as shown in FIG. 2 and also with a nozzle type bowl centrifuge 38 described below as shown in FIG. 3 and connected in series with the solid bowl machine 37.

The digester 31 is connected to a sludge discharge conduit 39 which is provided with control valve 40 and has a pump 41 operable to supply partially digested sludge from the digester to the solid bowl machine 37 at a rate controlled in relation to the rate of sludge feed into the digester tank namely in the special manner and for purposes of the invention furthermore to be set forth.

According to the invention, the operation of the solid bowl centrifugal machine is conducted so as to selectively deliver a largely inert or undigestible solids fraction in the nature of a highly concentrated cake material having a solids concentration in the order of 40% and a dilute fraction or suspension carrying most of the undigested gasifiable solids in the sludge. The concentrate or cake fraction representing well digested sludge discharging at 43 may be disposed of in any suitable manner for example as indicated by the conveyor 44. A conduit 44a having a control valve 44b bypasses the digester enabling excess raw sludge to be supplied directly to the solid bowl machine 37.

The overflowing dilute suspension of digestable matter, however, is transferred from the solid bowl machine for further separation treatment to the nozzle type bowl centrifuge 37 via a transfer conduit 45 by a pump 46. This nozzle type centrifuge will deliver as underflow from the discharge nozzles of the rotor bowl the relatively concentrated solids fraction 47 containing substantially all of the undigested gasifiable material, while the liquor fraction discharges as overflow from the bowl, and may be recirculated via return conduit 48 by pump 49 for retreatment into the primary clarifier tank. The underflow or nozzle discharge product 47, however, from this machine is recycled to the digester tank as indicated by the return conduit 50 provided with control valve 51, care being taken in the operation of the machine to have the digestable solids delivered therefrom in a relatively highly concentrated state. A suitable underflow concentration is attainable in the operation of this machine by adjusting the rate of underflow return, that is the rate at which the underflow product or gasifiable matter is recycled into the separating chamber of the rotor bowl, this effect being further explained in connection with the detail description of the machine in FIG. 3 below. With respect to practicing the invention, this underflow recirculation rate may be so adjusted that there is attainable an optimum of concentration compatible with the resulting quality of the liquor fraction overflowing from the machine and returnable for retreatment to the head end of the plant.

The raw sludge fed to the digestion system, for example, may be either raw primary clarifier sludge alone or a mixture of primary and secondary clarifier sludges. These sludges may be subjected to thickening as in tank 27, in a manner conducted and controlled in accordance with the teaching of the patent to Torpey No. 2,850,449, whereby there are attainable sludge concentrations of raw primary sludge to the extent of about 9% to 12% total solids concentration, while the mixed sludges may attain a concentration from 5% to 9%, more or less. Such a thickening operation, by reducing the burden of liquor in the digester tank will thus relatively increase the detention time of the total solids enabling a relatively higher solids loading, higher digester efficiency, and better tank utilization, all of which is further increased by additionally selectively increasing the relative detention time of the digestable gasifiable organic solids including the slowly digesting fats. This thickening operation also provides in the thickener a bed of thickened sludge adapted to serve as a reservoir or cushion from which the digester may be supplied substantially continuously or at relatively short intervals, thereby sustaining uniformly high digestion efficiency, that is maximum gas production per unit of space per unit of time in the digester tank.

With respect to this thickening operation, the aforementioned Torpey patent proposes to conduct the clarification operation and the associated thickening operation in a certain relationship to each other, whereby the primary clarifier will deliver a high quality primary effluent freed as far as possible of suspended organic sewage matter, while the thickener delivers a sludge having a consistently high concentration such as indicated above.

Briefly, according to the Torpey patent, the high grade primary clarifier effluent, that is an effluent containing a minimum of suspended sewage matter, is obtainable if the primary underflow sludge is drawn from the clarifier tank at relatively higher rates, that is relatively dilute as a result of relatively short detention in the tank. With the primary clarifier sludge thus remaining relatively unaged, and relatively fresh although relatively dilute, subsequent septicity of the sludge solids and resultant gassing is avoided, which would otherwise deteriorate the primary overflow or else would upset the specially controlled thickening operation.

With respect to the control of the thickening operation itself the Torpey patent involves among other correlated operating factors a sludge bed of substantial depth so controlled with respect to sludge detention time that septicity is avoided even through a thickened sludge of the aforementioned high solids concentration is thereby consistently producible.

Furthermore, with the proportion of secondary sludge thus relatively minimized due to capture of solids in the primary clarifier tank, the mixture of primary and secondary sludge is rendered more readily amenable to concentration in the above outlined thickening operation.

In this way, only a relatively very small but highly loaded thickening tank is required, occupying an area which may be only a fraction of the total clarifier tank area, capable of producing solids concentrations in the thickened sludge ranging from about 9% to about 12% for primary sludge, and from about 5% to about 9% for mixed primary and secondary sludges. The thickener thus serves as a combined concentration and storage unit.

The function of the digestion system outlined in the foregoing embodiment according to FIG. 1, will be furthermore understood from the following detailed description of the two centrifugal machines 37 and 38 semi-diagrammatically illustrated in FIGS. 2 and 3 respectively cooperating with the digester tank 31.

In distinction from "nozzle type" centrifuges wherein the rotor bowl has nozzles for discharging the concentrate fraction or underflow, the so-called "solid bowl" centrifugal machine 37 (see FIG. 2), has a rotor structure 52 rotating in a housing 53 which may be sealed against the atmosphere. The housing has a discharge neck 54 located at the wide end of the trunco-conically shaped rotor structure and connected to the transfer conduit 45 for delivering the overflow fraction containing the undigested gasifiable matter to be subject to further separation treatment in the subsequent centrifugal machine 38. The separated solids or stabilized cake fraction 43 (see FIG. 1) containing mostly undigestible solids leaves the machine through a discharge neck 55 for further disposal in any suitable manner such as indicated by the conveyor 44.

The rotor structure 52 comprises a bowl which has a trunco-conically shaped body portion 55 provided with an end closure plate 56 at the narrow end and an end closure plate 57 at the opposite or wide end thereof. The separated solids or cake fraction representing the digester sludge discharges centrifugally from the bowl through openings 58 provided adjacent to the narrow end of the bowl. The opposite end closure plate 57 has overflow openings 59 associated with adjustable weir plates 60 determining the overflow level of the annular body "O" of liquid undergoing centrifugal separation in the bowl. Arrows D at the wide end indicate delivery over these weir plates of the liquid fraction or suspension carrying the undigested matter to be further subjected to dewatering or concentration.

Within the trunco-conically shaped rotor bowl of this machine there is rotatably mounted a conically shaped conveyor element 61 conforming to the inner contour of the bowl and adapted to be rotated at a differential speed relative to the rotation of the bowl, so that the spirally shaped flights 62 therof will move the centrifugally separated solids comprising most of the digested solids, out of the liquid body "O" to emergence onto the narrow end portion, the so-called beach portion "H" of the bowl, finally causing the material to discharge centrifugally through the openings 58 for disposal in the form of a relatively dry cake material.

The sludge from the digester enters this machine through an axially arranged stationary feed tube 63 introducing feed sludge, for example, into receiving chambers 64 and 65 formed in the hollow hub portion 66 of the flight conveyor element, and then through openings 67 and 68 into the annular liquid body "O" undergoing centrifugal separation in the bowl.

As applied in the digester operating cycle of this invention, the operation of the solid bowl centrifugal machine receiving the partially digested sludge from the digester, may be controlled so as to remove varying amounts of the certain solids fraction from the partially digested sludge. This can be done by adjusting the rate of sludge feed into the machine, that is the pumping rate from the digester. Namely, as the feed rate is increased, the percentage of heavy undigestible matter increases in the discharging cake, while displacing the more digestible volatile matter into the overflow for return into the digester. Such selective displacement is effected since the undigestible volatile matter, for example, cellulose fibers, has a high specific gravity facilitating centrifugal separation, whereas the digestible fats and greases being attached to or occluded in other substances have resulting specific gravities slightly heavier than water. Therefore, a significant portion or substantially all of these fats and greases may be caused to appear in the overflow of this solid bowl machine, the overflow then to be subjected to dewatering or solids concentration and return of the concentrate into the digester.

It is these greases that have the most objectionable characteristics in the digested sludge, and their potential loss accounts for a large loss of digester gas of high quality, since 1 lb. of grease in digestion will produce 23 cu. ft. of gas at 72% $CH_4$. Moreover as previously indicated, this material normally retards the digestion process as a whole because its destruction or gasification proceeds so much slower than that of the other main components, the carbohydrates and the proteins, yet will produce the bulk of the gas developing after the initial 6 to 10 days of digester detention time. But in the digester operating cycle of this invention, when in balance, the required length of grease digestion time can be selectively established and imposed.

The nozzle type centrifugal machine according to FIG. 3, an example of which is to be found in U.S. Patent No. 2,559,453, mainly comprises a rotor 69 provided with peripherally arranged underflow discharge nozzles 70 which deliver the aforementioned undigested gasifiable matter in a relatively concentrated state, the bowl further having an overflow 71 at its upper constricted end discharging the separated liquor to be recirculated for retreatment as through conduit 48. The rotor has an upwardly extending shaft 72 suspended from a thrust bearing 73 for rotation of the rotor structure in a housing structure 74. Such a machine is equipped with means for controlling the solids concentration of the underflow fraction discharging from the nozzles. These control means being known of themselves comprise an underflow return conduit 74a terminating in the upwardly directed induction nozzle 74b. The discharge valve 51 is operable to control the rate of underflow recirculation through the return conduit 74a, and thereby to control the solids concentration of the underflow material delivered by this machine for return to the digester 31.

More particularly, the rotor bowl comprises a pair of trunco-conical end portions 75 and 76 with the underflow discharge nozzles arranged in the peripheral zone of the bowl where the wide ends of the trunco-conical portions join each other. A hub portion 77 defines a centrifugal separating chamber 78 above and a receiving chamber 79 below, with divergent inflow ducts 80 leading from the receiving chamber to the region of the nozzles.

The shaft 72 is surrounded by a feedwell member 81 constituting part of the rotor structure, the feedwell member in turn being surrounded by the usual stack of separator discs 81a. A stationary annular feed supply duct 82 surrounding the shaft extends from the top of the housing into the feedwell 81, having an influent connection 83 receiving the undigested matter or dilute overflow fraction via conduit 45 from the preceding centrifuge 37.

Through inlet passages 84 at the lower end of the feedwell member 81 the dilute feed suspension enters the separating chamber of the rotor bowl, whereby the centrifugally concentrated undigested sewage matter discharges through the nozzles into the surrounding volute portion 85 of the housing, while separated liquor discharges by way of overflow 71 into the receiving chamber 86 of the housing, from where the pump 49 may recirculate it for retreatment to the head end of the plant.

The relatively concentrated undigested gasifiable sewage matter constituting the underflow fraction discharging from the rotor nozzles, leaves the machine through the control valve 51 for return to the digester 31 while underflow material is kept recirculating through the return conduit 74a and induction nozzle 74b into the receiving chamber 79 of the rotor bowl and then through the divergent ducts 80 to the nozzles 70 in the separating chamber of the bowl.

In operation, the solids concentration of the underflow material may be relatively increased by throttling the discharge valve 51, thereby increasing the underflow recirculation rate in the machine. Conversely, a lowering of the solids concentration of the underflow may be effected by correspondingly opening the valve 51. In either instance, after an adjustment of the discharge valve 51 has been made, the operation of the machine will balance itself at the resulting respective underflow solids concentration.

As applied in the digester operating cycle of this invention the nozzle type machine having received the slow digestible material notably the fats in the overflow from the solid bowl machine, will, therefore, deliver such material as nozzle discharge or underflow at the desired and controlled solids concentration suited for return into the digester, while a retreatable overflow or separated liquor may be recirculated to the initial treatment section, minimizing the recirculating load on the plant.

As a net result, the digester operating cycle produces a highly digested sludge in spite of the fact that only partially digested sludge is delivered from the highly loaded digester.

Figure 6:
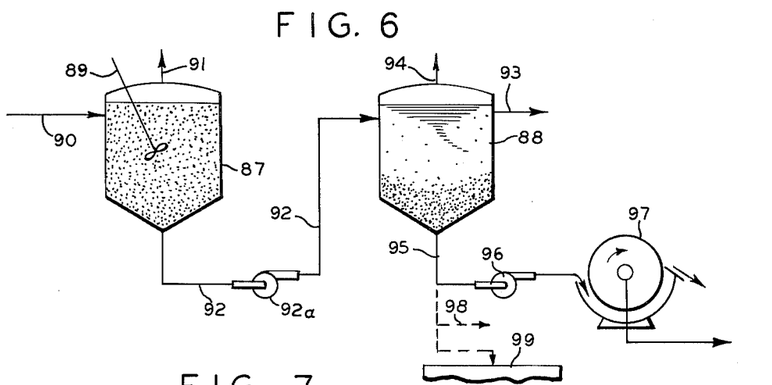
FIG. 6 is representative of a conventional two-stage digestion system.

Existing two-stage digestion systems may be advantageously converted in various ways to embody the invention. A conventional two-stage digestion system such as illustrated in FIG. 6 may comprise the usual primary digester tank 87 and secondary digester tank 88. The primary tank contains a body of sludge kept in a state of enforced agitation as indicated by the agitator 89, and is operated to evolve the major portion of the available gas in this sludge. The secondary digester tank while producing a relatively small balance of the gas, is operated to provide sufficient quiescence between periods when sludge is being transferred from the primary to the secondary tank, to separate digester liquor or supernatant from digester sludge collecting in the bottom zone of the tank. The primary digester tank has a raw sludge supply indicated at 90, and a gas discharge at 91. A sludge transfer conduit 92 leads from the primary to the secondary tank, a transfer pump 92a being shown to effect transfer of the sludge at the aforementioned desired intervals. Digester supernatant discharges from the secondary tank at 93, with gas delivery shown at 94. A discharge conduit 95 and pump 96 deliver digester sludge formed by settling in the conical bottom of the secondary tank, the final disposal of the digester sludge from the tank being here shown either by way of continuous filtration as on a rotary drum filter 97 producing a filter cake to be hauled away, or by bulk haulage as indicated at 98, or by depositing the digester sludge directly on sludge drying beds indicated at 99 from which the dried sludge must be removed whenever necessary. However, all these conventional modes of disposal of digester sludge have drawbacks and limitations mainly with respect to cost and labor, but also with respect to space requirements (filter beds), which may be greatly alleviated or overcome by this invention.

Figure 7:
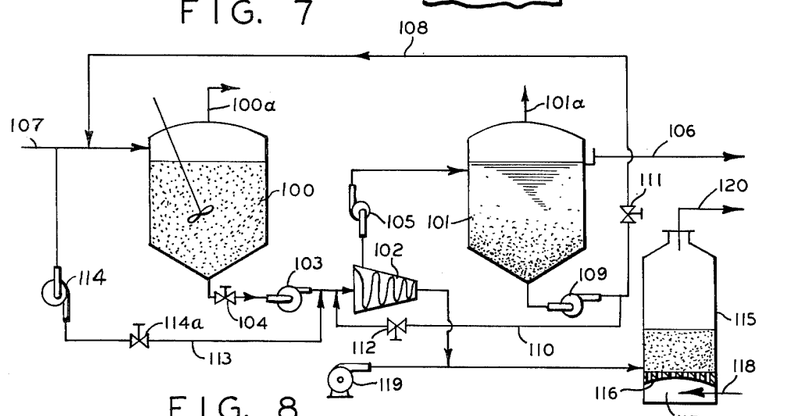
FIGS. 7 and 8 represent arrangements embodying the invention, resulting from conversions of conventional two-stage digestion systems.

In the embodiment of FIG. 7, the two digester tanks 100 and 101 of an original two-stage digestion system are utilized for the purpose of this invention, by having a solid bowl centrifugal machine 102 similar to the one shown in FIG. 2 and described above, functionally interposed between and connected in circuit with the two tanks. In the operation of this digester circuit a pump 103 draws partially digested sludge from the first tank 100 via control valve 104, for delivery thereof into the solid bowl machine 102, with gas 100a evolving from the agitated digesting mass. The solid bowl machine in the manner above set forth, delivers at one end a dilute overflow fraction substantially containing the undigested gasifiable matter of the partially digested sludge, while delivering from the other end the highly concentrated fraction of cake material substantially containing the undigestible matter of the sludge.

A pump 105 transfers the overflow fraction or suspension from the solid bowl machine to the second tank 101 in order to effect the further separation of this fraction into supernatant liquor and a sludge even though a small amount of residual gas 101a may still evolve from the contents of this tank. The supernatant liquor discharges from this tank by overflow indicated at 106, while sludge according to the invention containing the undigested gasifiable matter in concentrated form is recirculated to join raw sludge feed 107 into the first tank 100, such recirculation being effected through conduit 108 served by a pump 109. The result again, as in the first described embodiment of FIG. 1, is that the volatile solids loading of the digester is significantly increased whereas the digester liquor detention time is accordingly diminished.

However, in the embodiment of FIG. 7, provision is also made of a conduit 110 allowing for the return of a portion of the sludge derived from the second tank 101 into the solid bowl machine, the respective proportions being controllable as by the operation of valves 111 and 112. By this diversion of undigested sludge into the solid bowl machine, a portion of the undigested matter will find its way into the cake material discharging from the solid bowl machine, so that in this way the recycle loading in the digester may be lightened if so desired. Furthermore, if more raw sludge is supplied to the treatment plant than can be handled by the digestion system, then the excess raw sludge may be sent through by-pass conduit 113, pump 114, and control valve 114a directly into the solid bowl machine 102, which addition in turn will increase the proportion of undigested matter appearing in the cake material. Therefore, a sludge combustion unit 115 is provided, preferably one of the kind disclosed in copending patent application of Albertson and Budd, Serial No. 131,455, filed July 10, 1961, wherein moist sludge or the like may be subjected directly to combustion very effectively in a specially operated fluidized bed. However, digester gas may be employed to furnish auxiliary fuel if so desired.

The combustion unit 115 diagrammatically shown in the embodiment of FIG. 7 has a constriction plate 116 through which is forced combustion air from a windbox 117 below, the combustion air supply thereto being indicated at 118. Carrier air from blower 119 conveys the cake material from the solid bowl machine into the combustion chamber above the constriction plate where instantaneous odorless combustion is attainable. The resulting combustion gases which maintain the fluidized condition of the bed, leave the unit as stack gas 120 to be employed if so desired for preheating the combustion air for the unit.

Thus, while eliminating the conventional filter unit or other means of sludge disposal, a net increase of about 40% to 60% in digester capacity is made possible by this conversion of a conventional two-stage digestion operation, with gas produced in sufficient quantity to satisfy heating requirements and/or requirements for producing power. Furthermore, in case a still greater sludge load is to be handled by the plant, the excess sludge containing undigested matter will leave the solid bowl machine at much higher concentration than is attainable by the laborious filter operation, and is thus available in a form well suited for combustion. Considerable excess sludge load can thus be disposed of by the plant without the addition of new digester space, by the combination of the compact combustion unit with the solid bowl machine delivering a low moisture cake material for combustion.

Furthermore, in the embodiment of FIG. 7 the concentrating unit or settling tank 101 should be capable of consolidating overflow solids, that is the entrapped fats and others, to a minimum volume while maintaining an effluent low in suspended solids. But since the settling rates of these solids are quite low, it is necessary that correspondingly low flow rates be maintained in the settling unit, or else that the settling process be accelerated by the addition of chemicals, although care should be taken that the chemicals will not impair the anaerobic digestion process when the concentrated sludge reenters the digester unit. However, the required chemical dosing rates are very low, so that no deleterious effect need be anticipated especially if the common iron salts are employed as dosing agents for which the anaerobic bacteria have a fairly high tolerance. This equally applies to the use of the newer organic flocculating compounds.

Figure 8:
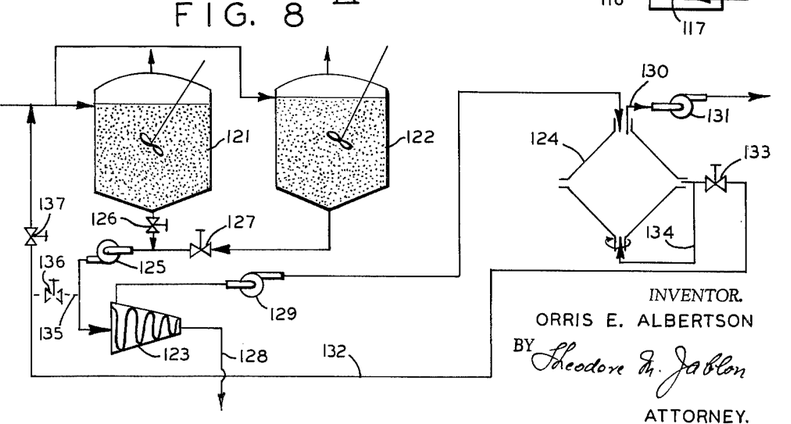

In the embodiment of FIG. 8, the two conventional digester tanks of a two-stage system are shown to have been utilized in a manner different from FIG. 7, namely in an arrangement capable of handling a greatly increased or multiple raw sludge load delivered to the treatment plant. In that case both tanks 121 and 122 are arranged so as to operate in parallel, thereby doubling the active digester volume with the sludge in both tanks heated as well as subjected to enforced agitation.

This combined digester volume of the two tanks operates in circuit with the two centrifugal machines 123 and 124 corresponding respectively to the solid bowl machine 37 and the nozzle type machine 38 cooperating with digester 31 in FIG. 1. A potential relative increase of digester capacity is thus attainable in the order of 250 to 350%, with the additional advantage that one or the other of the two digesters may be shut down for overhaul, while the need for a continuous vacuum filter is eliminated, and haulage of the much drier sludge from the solid bowl centrifuge greatly facilitated.

In the operation of this embodiment, partially digested sludge is drawn from the two digester tanks by pump 125 through respective control valves 126 and 127 for delivery into the solid bowl machine 123. As before in FIG. 1, the highly concentrated substantially stabilized cake material is discharged from the solid bowl machine as digested sludge 128, whereas the dilute overflow suspension carrying the undigested gasifiable material is transferred by pump 129 to the nozzle type machine 124 for concentration. Accordingly, the separated liquor overflows from this machine at 130 so that pump 131 may send it to the head end of the plant for retreatment as previously described, whereas the underflow product or undigested matter is returned to the digester via return conduit 132 with the concentration of the underflow product adjustable by manipulation of the discharge control valve 133 effecting the rate of underflow recirculation in the return connection 134. In addition, a branch connection 135 leads from the return conduit 132 to the feed end of the solid bowl machine, in order that by manipulation of control valves 136 and 137 the organics recycle load upon the digester may be reduced if so desired, this by-pass arrangement being similar in function to the branch conduit 110 in FIG. 7.

Conventional digester operation is governed by the required liquid detention time, and the digester capacity is dimensioned accordingly. Hence, the invention may be readily visualized by way of the graph in FIG. 9 wherein relative increases in digester efficiency over the conventional, present themselves as the result of selectively induced increases in digestible solids detention time relative to the basic liquid detention time, such increases being attainable in the digester operating cycle of this invention exemplified in the various embodiments above.

Figure 9:
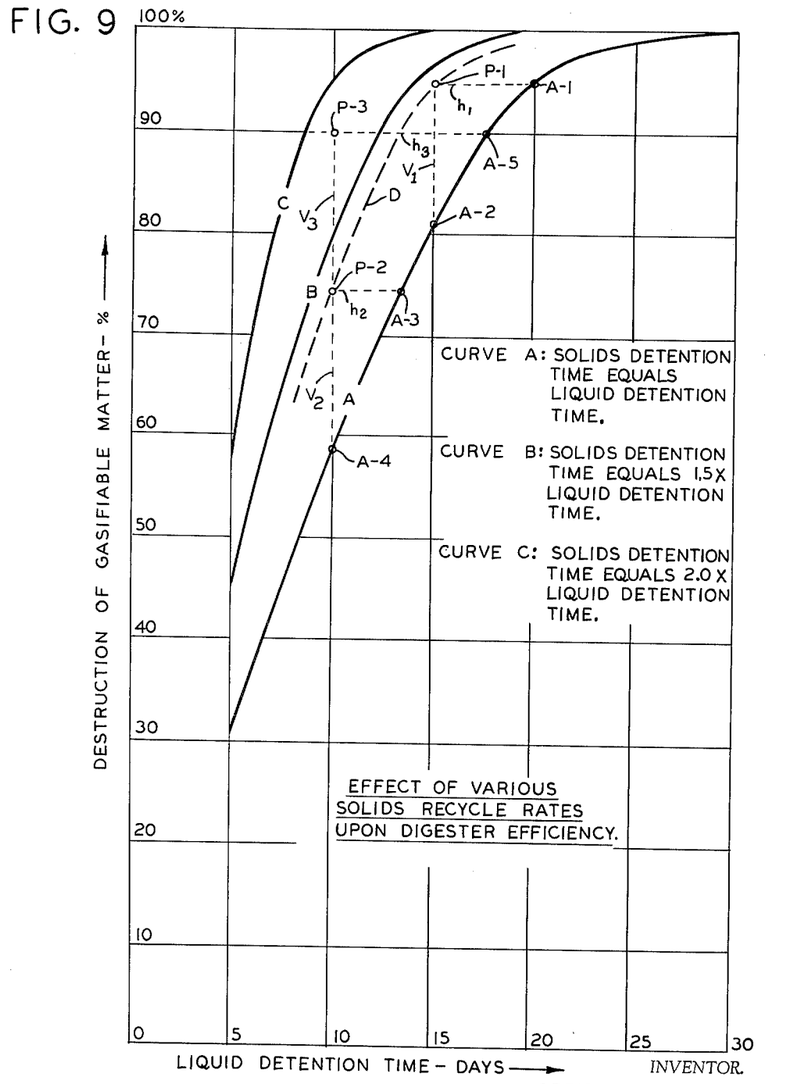
FIG. 9 is a graph showing increases in the digestion capacity of a given digester tank, as a function of controlling the detention time in accordance with this invention.

The graph in FIG. 9 represents a family of digester efficiency curves A, B, C with the digestion efficiency expressed in terms of percentages of destruction of gasifiable matter on the ordinate as a function of liquid detention time on the abscissa, based upon average conditions of raw sewage sludge supplied to the digester. With the curve A reflecting conventional or two-stage digestion operation, curves B and C represent comparative increases in digester efficiency due to respective selectively induced increases in the detention time of the gasifiable solids in the digester.

With respect to the conventional operation it is to be observed that the destrutcion of volatile matter by anaerobic digestion proceeds almost linearly in a range between 5 days and 20 days liquid detention time, indicating that 20 days of detention time have caused the decomposition of the bulk of the organic matter into $CO_2$ and $CH_4$. However, for comparison with the invention, in curve A, a liquid detention time of 30 days is taken as the basis for achieving substantially complete gas recovery from the normally gasifiable matter in the sludge, since 30 days of digestion have been found by prior investigators in laboratory as well as field studies as achieving substantially complete digestion. Hence, with the terminal point of curve A located at 100% Destruction of Gasifiable Matter and 30 days Liquid Detention Time, the values of solids destruction down in that curve down to 5 days detention time are representative of the amounts of organics destruction that may be expected under average conditions of conventional digester operation.

Discussing the Curves A, B, C in more detail, we find:

Curve A serving as a basis of comparison relative to the invention, represents the condition of conventional sewage sludge digestion where the liquid and the solids detention time are identical. This curve indicates that it is not practical to operate in the low range of liquid detention time, say 5 to 12 days, because of the relatively small amount of destruction of gasifiable matter (30%–65%) attainable during that period.

Curve B represents the operation of the digester embodying the invention with enough separated and concentrated gasifiable solids returned to the digester to provide a gasifiable solids detention time in the digester equal to 1.5 times the liquid detention time. A relatively high rate of organic destruction is thus achieved and correspondingly better tank utilization. This curve indicates that 10 days of liquid detention will accomplish the same amount of destruction of gasifiable matter as may be conventionally attained in 15 days.

In the case of Curve C, the rate of recirculation of concentrated gasifiable solids into the digester is such that the digestable solids detention time is equal to about twice the liquid detention time, resulting in a still greater rate of destruction of gasifiable matter and accordingly still further improved tank utilization, the curve indicating that 10 days of liquid detention time will accomplish the same as 20 days under conventional conditions.

The invention is more specifically substantiated by way of two operating examples contained respectively in the following Tabulations A and B, and illustrated respectively in FIGS. 4 (Example I) and FIG. 5 (Example II).

Figure 4:
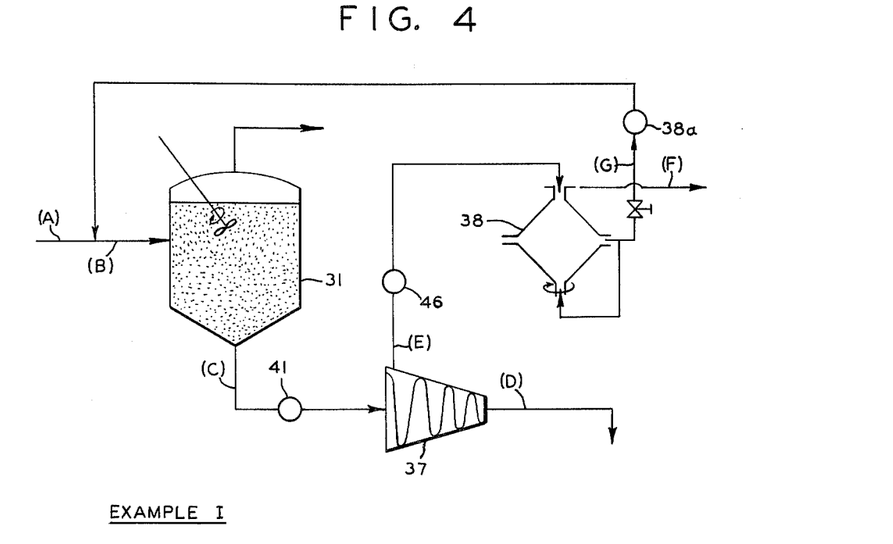
FIGS. 4 and 5 illustrate examples of operation of a digester system embodying the invention at respectively different raw feed sludge concentrations.

TABULATION A
[Pertaining to Fig. 4]

|  | (A) New Sludge Feed to Digester | (B) Total Sludge Feed to Digester | (C) Digester Sludge into First Centrifuge | (D) Cake Discharge from First Centrifuge | (E) Overflow from First Centrifuge | (F) Underflow from Second Centrifuge | (G) Overflow from Second Centrifuge |
|---|---|---|---|---|---|---|---|
| Total Solids (T.S.[1]), Percent | 4.0 | 4.3 | 2.15 | 40.0 | 0.68 | 0.07 | 8.0 |
| Total Solids (T.S.), lbs./day | 6,250 | 7,240 | 3,600 | 2,500 | 1,100 | 110 | 990 |
| Volatile Solids (V.S.[2]), percent | 80.0 | 79.5 | 60.0 | 50.0 | 77.2 | 77.2 | 77.2 |
| Volatile Solids (V.S.), lbs./day | 5,000 | 5,765 | 2,100 | 1,250 | 850 | 85 | 765 |
| Volume, cu. ft./day | 2,500 | 2,690 | 2,190 |  | 2,590 | 2,400 | 190 |
| Volume, gals./day | 18,750 | 20,170 | 20,170 |  | 19,420 | 18,000 | 1,420 |

[1] T.S.=Total Solids.  [2] V.S.=Volatile Solids.

Figure 5:
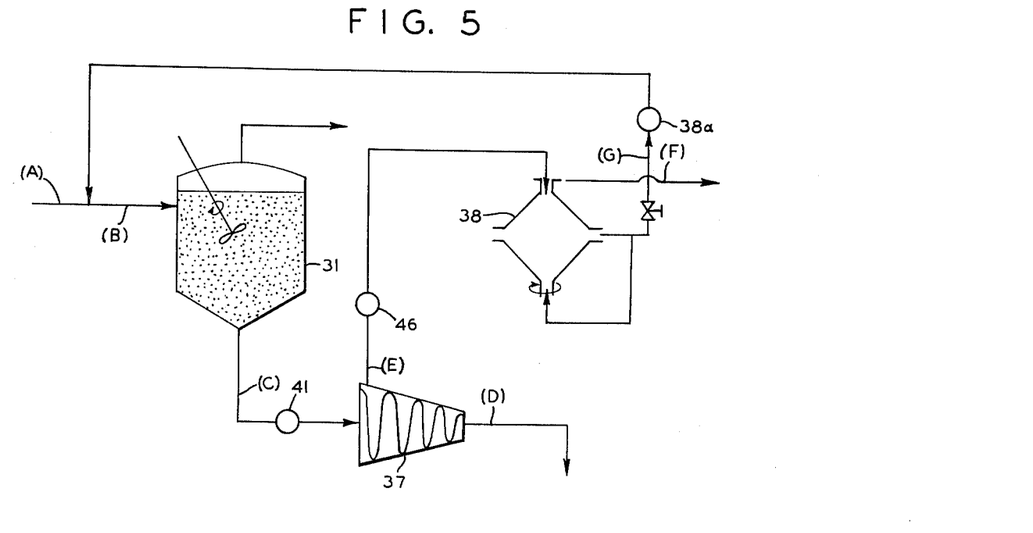

TABULATION B
[Pertaining to Fig. 5]

|  | (A) New Sludge Feed to Digester | (B) Total Sludge Feed to Digester | (C) Digester Sludge into First Centrifuge | (D) Cake Discharge from First Centrifuge | (E) Overflow from First Centrifuge | (F) Underflow from Second Centrifuge | (G) Overflow from Second Centrifuge |
|---|---|---|---|---|---|---|---|
| Total Solids (T.S.[1]), percent | 10.0 | 9.65 | 4.76 | 40.0 | 1.62 | 0.19 | 8.00 |
| Total Solids (T.S.), lbs./day | 6,250 | 7,240 | 3,600 | 2,500 | 1,100 | 110 | 990 |
| Volatile Solids (V.S.[2]), percent | 80.0 | 79.5 | 60.0 | 50.0 | 77.2 | 77.2 | 77.2 |
| Volatile Solids (V.S.), lbs./day | 5,000 | 5,765 | 2,100 | 1,250 | 850 | 85 | 765 |
| Volume, cu. ft./day | 1,000 | 1,190 | 1,190 |  | 1,090 | 900 | 190 |
| Volume, gals./day | 7,500 | 8,920 | 8,920 |  | 8,170 | 6,750 | 1,420 |

[1] T.S.=Total Solids.  [2] V.S.=Volatile Solids.

The operating check points (A) through (G) in the identical flowsheets of FIGS. 4 and 5, correspond to the data columns (A) through (G) in the respective tabulations which have captions provided at the head of each data column, such as "New Sludge Feed to Digester," "Total Sludge Feed to Digester," etc. The data of these columns (A) through (G) in turn are separately grouped in the respective FIGS. 4 and 5 of the drawings and are designated accordingly by these letters.

It will be seen that Example I and Example II embrace a practical range of solids concentration of feed sludge going into the digester, namely from 4% in Example I to 10% in Example II. However, since the efficiency of digester operation in terms of destruction of gasifiable matter per unit of time is independent of the feed sludge concentration, the operating data of both FIG. 4 and FIG. 5 may be evaluated and visualized graphically within the scope of the graph in FIG. 9 discussed above, as follows:

In the conventional digestion, 15 to 20 days detention time will destroy about 50% of the organic solids fed thereto per day. Thus, with respect to Examples I and II, since 5,000 lbs. per day of volatile solids are supplied (see check point (A) in both FIGS. 4 and 5), the amount destroyed by gasification would be 2,500 lbs. per day. But since the amount of recycle of separated gasifiable solids (see check point (E) in both FIGS. 4 and 5) is 850 lbs. of volatile solids per day, the recycle then is determined by $$\frac{850}{2500} = 34\% = \text{Recycle Rate}$$

of the total gasifiable matter in the sludge, which means that the solids detention time in practicing the invention in this instance will be 34% greater than the liquid detention time, irrespective of feed solids concentration.

Given a 15-day detention capacity in the digester and applying the above 34% digester recycle rate, the resulting effective solids detention time then is 15 days × 1.34 = 20 days Solids Detention Time The operating condition is representable as point P-1 in the graph, located intermediate the aforementioned efficiency curves B and C. Point P-1 is established by the intersection of horizontal line $h_1$ with vertical line $V_1$, where $h_1$ must pass through point A-1 located on curve A at 20 days liquid detention time, and $V_1$ is the upward extension of the ordinate defining point A-2 located on curve A at 15 days liquid detention time. Accordingly, with a 34% digester recycle rate and a digester capacity of 15 days liquid detention time available, the organic destruction is 94% (see point A-1) as compared with only 81% (see point A-2) conventional.

But, given only a digester capacity of 10 days liquid detention time while applying again the above 34% digester recycle rate, the resulting effective solids detention time then is 10 days × 1.34 days Solids Detention Time This operating condition is representable as point P-2 located intermediate the aforementioned efficiency curves A and B. Point P-2 is established by the intersection of horizontal line $h_2$ with vertical line $V_2$, where $h_2$ must pass through a point A-3 located on curve A at 13.4 days liquid detention, and $V_2$ is the upward extension of the ordinate defining point A-4 located on curve A at 10 days liquid detention time. Thus, with a 34% digester recycle rate and a digester capacity of 10 days liquid detention time available, the organics destruction then is 75% (see point P-2) of the gasifiable matter instead of 58% (point A-4) conventional.

As seen from the graph, the two operating points P-1 and P-2 above defined are then construable as points on an interposed curve D of a shape intermediate that of curves A and B.

Now, in order to increase the destruction in the case of operating point P-2, to the extent of, say, 90% as against 58% (see point A-4) conventional, without increasing the digester volume, a new and higher digester recycle rate is required. This recycle rate is graphically determinable in the graph, insofar as the new operating point P-3 is located vertically a distance $V_3$ above old point P-2 as well as on the horizontal line $h_3$ defining 90% destruction. The new recycle rate may then be derived graphically from point A-5 located at the intersection of $h_3$ with curve A and defined by an ordinate marking 17.3 days liquid detention time. The new required digester recycle rate then is determined by $$\frac{\text{Solids Detention Time}}{\text{Liquid Detention Time}} = \frac{17.5}{10} = 1.75 = \text{New Recycle Rate}$$

Operational control of the digester recycle rate in practicing the invention, may be as follows:

Since there must be substantial flow balance throughout the system if the digester equilibrium or sludge volume undergoing digestion is to be held constant, the volume of raw feed sludge into the digester must equal the total of the separated liquor volume derived from the concentrating station such as a second centrifuge 38 or the separating tank 101 and the volume of the cake discharging from the solid bowl centrifugal machine 37.

That is:

Raw feed into Digester plus Underflow from Concentrating station = Feed into Solid Bowl centrifuge.

Under equilibrium conditions the foregoing equation must be satisfied regardless of variations or changes in the digester recycle rate. Accordingly, since the overflow volume from the concentrating station remains constant, it is necessary to vary the underflow volume thereof proportional to the rate of feed into the solid bowl machine 37. Thus, any change made in the feed volume to the solid bowl machine for the purpose of changing the solids recycle rate, must proportionately be balanced by making a corresponding change in the volume of underflow from the concentrating station, with the raw feed volume into the digester remaining relatively unchanged.

In the case of the centrifuge 38 effecting the digestible solids concentration, correction of the underflow volume from that machine is attainable in a simple manner by opening or closing the discharge valve 51 of the centrifuge proportionately which will cause the machine to decrease or increase its own recirculation rate through conduit 74a, thereby delivering corresponding larger or smaller underflow volumes.

Similarly, when the settling tank 101 is used to effect the liquid separation (see FIG. 7) the required correction may be effected by controlling the underflow discharge by pump 109 in proportion to changes effected in the pumping rate of pump 103 feeding the digester sludge into the solid bowl machine. To this end, means may be provided whereby such changes with respect to the pumping rates of the two pumps, may be automatically synchronized.

Furthermore, where the addition of a chemical dosing agent is desired to encourage the separation of the solids fraction from the liquor as in the concentrating centrifuge 38, a dosing solution may be introduced by way of valve 51a into the stream of underflow recirculation whereby its thorough mixing with the underflow material is assured.

In summary, it will be seen that the invention provides improvements resulting in significant economical as well as operational advantages in the anaerobic digestion of various waste sludges, for example, primary sludges alone, or combined primary and secondary biological sludges.

By these improvements exceptionally high solids loading rates may be imposed upon the digester if a partially digested sludge delivered by the digester is fractionated into:

(a) an inoffensive digested sludge highly concentrated for disposal,
(b) an undigested sludge including the greases and the fats relatively concentrated for recirculation into the digester, and
(c) a separated liquor going to retreatment or to waste.

The undigested sludge fraction (b) having been shrunk in volume by the separation from the liquor, is recirculated to the digester, whereby the effective solids detention time in the digester is selectively increased to a suitably controlled extent and rendered independent of the liquor detention time, so that the greases and the fats will nevertheless be converted into gas. Thus, the improvements result in increased digester tank utilization relative to the conventional, along with lowered heat requirements for the digester, lowered construction and investment costs, and a reduction in labor along with the elimination of sludge filters and sludge drying beds, even while minimizing the space requirements of the plant especially where the two centrifuges 37 and 38 of FIG. 1 are included in the digester operating circuit.

The improvements furthermore allow for the handling and disposal of excessive raw sludge loads, in that the excess sludge may by-pass the digester for dewatering in the solid bowl centrifuge and thus preparing for combustion of the highly concentrated sludge cake. Moreover, the improvements readily lend themselves for the conversion of existing conventional two-stage digestion systems to embody the invention, while utilizing the existing digester tanks in the cyclic digester operations some of which have been exemplified above. Also, while liquor is eliminated by the concentrating operation from the digester operating cycle, a quantity of biological organisms contained in the concentrate or attached to the solids therein, is returned into the digester.

I claim:

1. A treatment system for the anaerobic digestion of putrescible waste sludge derived from a clarification treatment, which comprises a digestion station for containing a body of sludge undergoing digestion; means for feeding said waste sludge to said body of digesting sludge; means for withdrawing from said digestion station partially digested sludge; a solid bowl type centrifuge machine having a conically shaped rotor bowl with means adapted to discharge an overflow suspension from the wide end of the bowl and for discharging centrifugally separated solids as a cake material transported to the narrow end thereof; means for feeding said partially digested sludge to said solid bowl machine for effecting the separation and classification thereof into an overflow fraction substantially containing the undigested matter of said partially digested sludge, and a concentrated portion of cake material substantially containing the non-digestible sludge solids delivered from the system; separating means for dewatering said overflow fraction of the solid bowl machine separate from said clarification treatment; means for feeding overflow from said bowl to said separating means and means for returning thus dewatered undigested matter to the digestion station.

2. The system according to claim 1, wherein said dewatering means comprise a nozzle type centrifugal machine adapted to discharge said undigested matter in relatively concentrated form as underflow from the nozzles of the rotor bowl of the machine, while discharging separated liquor as overflow fraction from said bowl, with means for controlling the concentration of the underflow material by controlling recirculation thereof into the centrifuge separating chamber of the bowl.

3. The system according to claim 1, wherein said dewatering means comprise a settling tank with means for withdrawing sludge from the bottom zone therein and liquor discharging from the top.

4. A treatment system for the anaerobic digestion of putrescible waste sludges derived from a clarification treatment, which comprise a digestion station for containing a body of the sludge undergoing digestion; means for feeding said waste sludge to said body of digesting sludge; means for discharging partially digested sludge from said digestion station; a solid bowl type centrifugal machine having a conically shaped rotor bowl adapted for discharging an overflow suspension from the wide end of the bowl and for discharging centrifugally separated solids as cake material transported to the narrow end thereof; means for feeding said partially digested sludge to said solid bowl machine for effecting the separation and classification thereof into an overflow fraction substantially containing the undigested matter of said partially digested sludge, and a concentrated portion of cake material substantially containing the non-digestible sludge solids delivered from the system; separating means for dewatering said overflow fraction of the solid bowl machine separate from said clarification treatment; means for feeding overflow from said bowl to said separating means; means for returning at least a portion of the dewatered undigested matter to the digestion station to effect conversion thereof into gas; and other means for returning a portion of said dewatered undigested matter into said solid bowl machine.

5. The system according to claim 4, wherein said dewatering means comprise a nozzle type centrifugal machine adapted to discharge said undigested matter in relatively concentrated form as underflow from the nozzles of the rotor bowl of the machine, while discharging separated liquor as overflow fraction from said bowl, with means for controlling the concentration of the underflow material by recirculation thereof into the centrifugal separating chamber of the bowl.

6. The system according to claim 4, wherein said dewatering means comprise a settling tank with means for withdrawing sludge from the bottom zone therein and liquor discharging from the top.

7. A treatment system for the anaerobic digestion of putrescible waste sludges derived from a clarification treatment, which comprises a digestion station for containing a body of the sludge undergoing digestion; means for feeding said waste to said body of digesting sludge; means for discharging partially digested sludge from said digestion station; a solid bowl type centrifugal machine having a conically shaped rotor bowl adapted for discharging an overflow suspension from the wide end of the bowl and for discharging centrifugally separated solids as cake material transported to the narrow end thereof; means for feeding said partially digested sludge to said solid bowl machine for effecting the separation and classification thereof into an overflow fraction substantially containing the undigested matter of said partially digested sludge, and a concentrated portion of cake material substantially containing the non-digestible sludge solids delivered from the system; separating means for dewatering said overflow fraction of the solid bowl machine separate from said clarification treatment; means for feeding overflow from said bowl to said separating means; means for returning dewatered undigested matter to the digestion station; a sludge combustion unit; means for feeding to said solid bowl machine raw sludge supplied in excess of the capacity of the digestion station so that the discharging solids mixture in the cake contains a substantially corresponding quantity of undigested matter; and means for feeding said cake mixture to said combustion unit to effect the destruction of the undigested oxidizable matter therein by combustion.

8. The system according to claim 7, with the addition of means for returning a controlled portion of said dewatered undigested matter into said solid bowl machine.

9. The system according to claim 7, wherein said dewatering means comprise a settling tank with means for withdrawing sludge from the bottom zone therein and liquor discharging from the top.

10. A treatment system for the anaerobic digestion of putrescible waste sludges derived from a clarification treatment, which comprises a digestion station for containing a body of the sludge undergoing digestion; means for feeding said waste sludge to said body of digesting sludge; means for discharging partially digested sludge from said digestion station; a solid bowl type centrifugal machine having a conically shaped rotor bowl adapted for discharging an overflow suspension from the wide end of the bowl and for discharging centrifugally separated solids as a cake material transported to the narrow end thereof; means for feeding said partially digested sludge to said solid bowl machine for effecting the separation and classification thereof into an overflow fraction substantially containing the undigested matter of said partially digested sludge, and a concentrated portion of cake material substantially containing non-digestible sludge solids delivered from the system; separating means for dewatering said overflow fraction of the solid bowl machine separate from said clarification treatment; means means; means for returning dewatered undigested matter to the digestion station; a sludge combustion unit; means for feeding into said solid bowl machine a controlled portion of said dewatered undigested matter; and means for feeding the resulting concentrated cake mixture discharging from the narrow end of the solid bowl machine to said combustion unit to effect the destruction of any oxidizable matter therein by combustion.

11. The system according to claim 10, wherein said dewatering means comprise a settling tank with means for withdrawing sludge from the bottom zone therein and liquor discharging from the top.

12. The system according to claim 7, wherein said dewatering means comprise a nozzle type centrifugal machine adapted to discharge said undigested matter in relatively concentrated form as underflow from the nozzles of the rotor bowl of the machine, while discharging separated liquor as overflow fraction from said bowl, with means for controlling the concentration of the underflow material by recirculation thereof into the centrifugal separating chamber of the bowl.

13. The system according to claim 10, wherein said dewatering means comprise a nozzle type centrifugal machine adapted to discharge said undigested matter in relatively concentrated form as underflow from the nozzles of the rotor bowl of the machine, while discharging separated liquor as overflow fraction from said bowl, with means for controlling the concentration of the underflow material by recirculation thereof into the centrifugal separating chamber of the bowl.

14. A treatment system for the anaerobic digestion of sewage sludge derived from a sedimentation clarification system; which comprises means for thickening said sludge and providing a reservoir for thickened sludge; a digestion station for containing a body of the sludge undergoing digestion; means for feeding sludge from said reservoir substantially continuously to said body of digesting sludge; means for discharging from said digestion station partially digested sludge; a solid bowl type centrifugal machine having a conically shaped rotor bowl adapted for discharging an overflow suspension from the wide end of the bowl and for discharging centrifugally separated solids as a cake material transported to the narrow end thereof; means for feeding said partially digested sludge to said solid bowl machine for effecting the separation and classification thereof into an overflow fraction substantially containing the undigested matter of said partially digested sludge, and a concentrated portion of cake material substantially containing the non-digestible sludge solids delivered from the system; separating means for dewatering said overflow fraction of the solid bowl machine separate from said clarification system; means for feeding overflow from said bowl to said separating means; and means for returning dewatered undigested matter to the digestion station.

15. The system according to claim 14, wherein said dewatering means comprise a nozzle type centrifugal machine adapted to discharge said undigested matter in relatively concentrated form as underflow from the nozzles of the rotor bowl of the machine, while discharging separated liquor as overflow fraction from said bowl, with means for controlling the concentration of the underflow material by recirculation thereof into the centrifugal separating chamber of the bowl.

16. The system according to claim 14, wherein said dewatering means comprise a setting tank with means for withdrawing sludge from the bottom zone therein and liquor discharging from the top.

17. A treatment system for the anaerobic digestion of putrescible waste sludges, which comprises a digestion station for containing a body of the sludge undergoing digestion; means for feeding said waste sludge to said body of digesting sludge; means for discharging partially digested sludge from said digestion station; solid bowl centrifuge apparatus for separating the partially digested sludge into a dilute overflow fraction containing at least a substantial portion of the undigested gasifiable matter in the sludge, and a concentrated fraction substantially containing non-digestible sludge solids, delivered from the system; means for feeding said partially digested sludge to said separating apparatus to effect the separation thereof into said fractions; means for concentrating said dilute centrifuge overflow fraction by separating therefrom a separate liquid fraction; means for feeding said first dilute overflow fraction from said centrifuge to said concentrating means; and means for returning concentrated undigested matter from said concentrating means to the digestion station.

18. The method of treating putrescible waste sludges derived from a clarification treatment to effect the anaerobic digestion thereof, which comprises maintaining a body of sludge undergoing digestion; feeding raw sludge to said body of digesting sludge; withdrawing partially digested sludge from the body of digesting sludge containing a mixture of non-digestible solids and undigested gasifiable matter; subjecting the withdrawn sludge to centrifugal separation treatment such as to effect the separation of the sludge into a dilute overflow fraction substantially containing said undigested gasifiable matter, and a concentrated fraction substantially containing said non-digestible sludge solids; wasting said concentrated non-digestible solids fraction; separating from said dilute overflow fraction a significant portion of the liquid in a treatment separate from said clarification treatment; and introducing the undigested matter of said overflow fraction into said body of digesting sludge.

19. The method acording to claim 18, which comprises the additional steps of subjecting to said centrifugal separating treatment raw sludge supplied in excess of the digestion capacity of said body of sludge, so that a substantially corresponding quantity of undigested matter is contained in the resulting concentrated mixture delivered by said separating treatment, and subjecting said concentrated mixture to combustion for effecting the destruction of any oxidizable matter therein.

20. The method according to claim 19, which comprises returning a portion of said concentrated mixture to said centrifugal separating treatment.

21. The method according to claim 18, which comprises returning the separated liquor to said clarification treatment.

22. The method of treating putrescible waste sludge to effect the anaerobic digestion thereof, which comprises maintaining a body of sludge undergoing digestion; feeding raw sludge to said body of digesting sludge; withdrawing partially digested sludge from the body of digesting sludge; subjecting the withdrawn sludge to centrifugal separating treatment such as to effect the separation of the sludge into a concentrated fraction substantially containing non-digestible solids, and a dilute overflow fraction substantially containing undigested gasifiable matter; wasting said concentrated fraction; concentrating said first dilute fraction by separating therefrom a separate liquid fraction; and returning concentrated undigested matter of said dilute fraction to said body of digesting sludge.

23. The system according to claim 1, wherein said dewatering means comprise a centrifugal machine adapted to discharge said undigested matter in relatively concentrated form, while discharging separated liquor as an overflow fraction.

(References on following page)

References Cited by the Examiner

UNITED STATES PATENTS

| | | | |
|---|---|---|---|
| 2,360,811 | 10/1944 | Kelly et al. | 210—8 |
| 2,596,616 | 10/1952 | Strezynski | 233—18 |
| 2,685,369 | 8/1954 | Crossley. | |
| 2,777,815 | 1/1957 | Forrest | 210—3 |
| 2,850,449 | 9/1958 | Torpey | 210—10 |

FOREIGN PATENTS

| | | |
|---|---|---|
| 1,162,158 | 4/1958 | France. |

OTHER REFERENCES

"Experimental Treatment of Citrus Waste Water," McNary et al., Proc. Eighth Ind. Waste Conf., Purdue Univ. (1953) pp. 256–274.

Torpey, Loading To Failure of A Pilot High-Rate Digester, Sewage and Ind. Wastes, February 1955, vol. 27, pp. 121–148, pp. 121–123 particularly relied on.

MORRIS O. WOLK, *Primary Examiner*.